(12) United States Patent
Dvorkis et al.

(10) Patent No.: US 7,445,339 B2
(45) Date of Patent: Nov. 4, 2008

(54) COLOR LASER PROJECTION DISPLAY

(75) Inventors: Paul Dvorkis, East Setauket, NY (US); Ron Goldman, Cold Spring Harbor, NY (US); Narayan Nambudiri, Kings Park, NY (US); Carl Wittenberg, Water Mill, NY (US); Chinh Tan, Setauket, NY (US); Miklos Stern, Woodmere, NY (US); Dmitriy Yavid, Stony Brook, NY (US); Frederick F. Wood, Medford, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 11/582,914

(22) Filed: Oct. 18, 2006

(65) Prior Publication Data

US 2007/0097335 A1    May 3, 2007

(51) Int. Cl.
*G03B 21/00* (2006.01)
(52) U.S. Cl. .......................................... 353/8; 359/464
(58) Field of Classification Search .................... 353/7, 353/8, 10; 359/464
See application file for complete search history.

(56) References Cited

U.S. PATENT DOCUMENTS

| | | | | |
|---|---|---|---|---|
| 4,978,202 | A * | 12/1990 | Yang | 349/15 |
| 5,193,015 | A * | 3/1993 | Shanks | 349/115 |
| 5,347,644 | A * | 9/1994 | Sedlmayr | 359/465 |
| 2006/0181769 | A1* | 8/2006 | Kumasawa et al. | 359/449 |

* cited by examiner

*Primary Examiner*—Christopher Mahoney
(74) *Attorney, Agent, or Firm*—Kirschstein, et al.

(57) ABSTRACT

A method and apparatus are provided to provide a laser projection display (LPD).

10 Claims, 14 Drawing Sheets

COLOR LASER PROJECTION DISPLAY

BACKGROUND OF THE INVENTION

1. Field of the Invention

This invention relates generally to electronic displays, and, more particularly, to a laser projection display.

2. Description of the Related Art

Electronic displays have historically suffered from a number of shortcomings, including high cost, lack of durability, size, weight, limited flexibility and the like. The present invention is directed to overcoming, or at least reducing, the effects of one or more of the problems set forth above.

SUMMARY OF THE INVENTION

In one aspect of the instant invention, an apparatus for displaying information in vehicle is provided. The apparatus comprises a laser projector and a viewing surface positioned to receive a variable image from the laser projector.

BRIEF DESCRIPTION OF THE DRAWINGS

The invention may be understood by reference to the following description taken in conjunction with the accompanying drawings, in which like reference numerals identify like elements, and in which.

Figure 1:
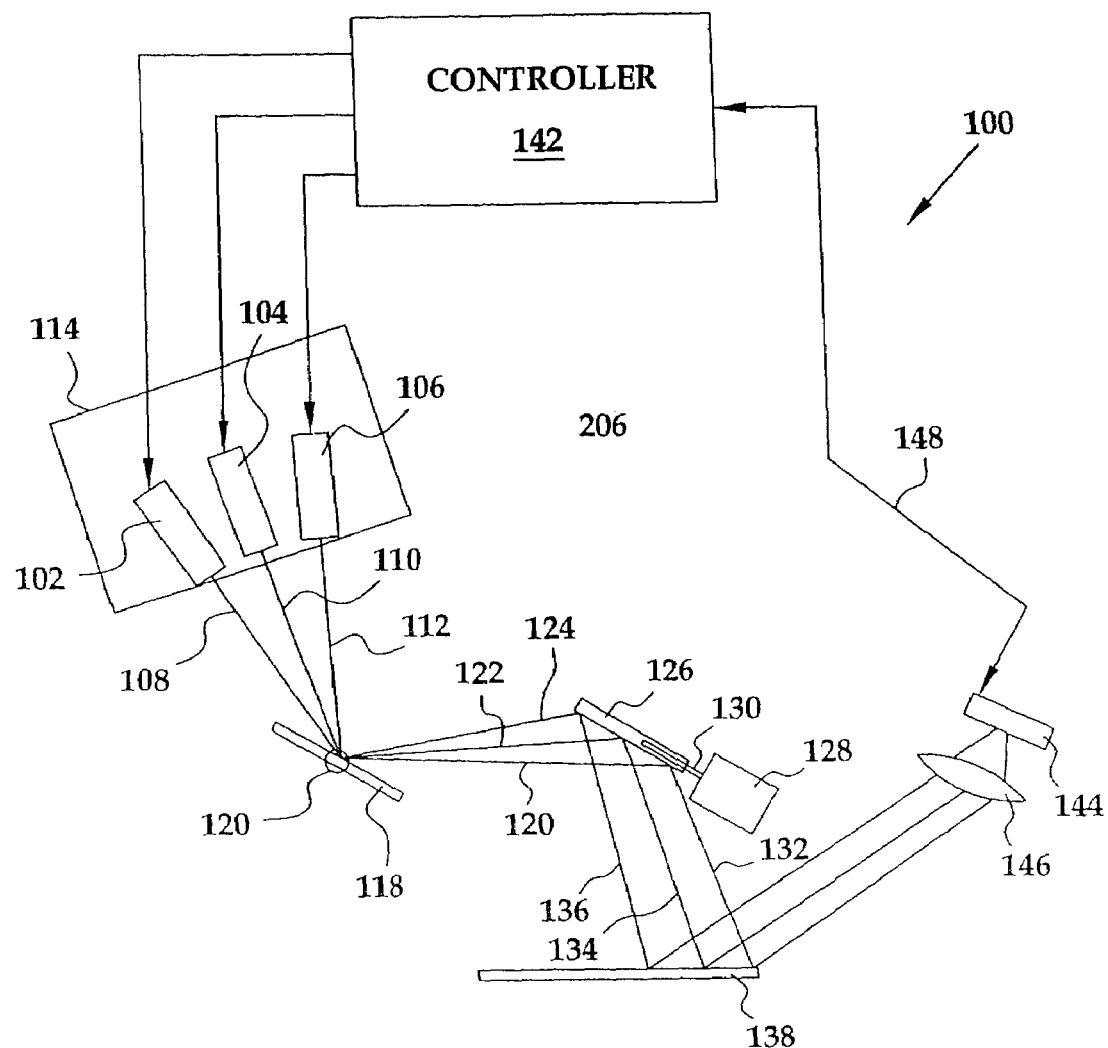
FIG. 1 is a stylistic block diagram of a top level view of one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless; be a routine undertaking for those of ordinary skill in the art having the benefit of this disclosure.

The following co-pending applications are hereby incorporated by reference herein in their entirety: Method and Apparatus for Aligning a Plurality of Lasers in an Electronic Display Device, by Mik Stern et. al.; Method and Apparatus for Controllably Reducing Power Delivered by a Laser Projection Display, by Mik Stern et. al.; Method and Apparatus for Displaying Information in Automotive Applications Using a Laser Projection Display, by Narayan Nambudiri et. al.; Method and Apparatus for Providing an Interface Between a Liquid Crystal Display Controller and a Laser Projection Display, by Narayan Nambudiri et. al.; Method and Apparatus for Capturing Images Using A Color Laser Projection Display, by Chinh Tan et. al.; Method and Apparatus for Conserving Power in a Laser Projection Display, By Fred Wood et. al.; A Laser Projection Display, by Ron Goldman et. al.; Method and Apparatus for Controllably Compensating for Distortions in a Laser Projection Display, by Carl Wittenberg et. al.; and Method and Apparatus for Controllably Modulating a Laser in a Laser Projection Display, by Dmitriy Yavid et. al.

Turning now to the drawings, and specifically referring to FIG. 1, a stylistic block diagram of a laser projection display (LPD) 100, in accordance With one embodiment of the present invention, is shown. In the illustrated embodiment, the LPD 100 includes three lasers 102, 104, 106, each capable of emitting a beam of light 108, 110, 112 consisting of a unique color, such as red, green or blue. Those skilled in the art will appreciate that the number of lasers and the color of light emitted therefrom may be varied without departing from the spirit and scope of the instant invention.

The lasers 102, 104, 106 are arranged in a common plane 114 with the beams of light 108, 110, 112 being angularly directed relative to one another to fall on a substantially common location 116 on a first scanning device, such as a first scanning mirror 118, from where they are reflected as beams of light 120, 122, 124. In the illustrated embodiment, the first scanning mirror 118 oscillates on an axis 120 at a relatively high rate (e.g., about 20-30 KHz). Rotation or oscillation of the first scanning mirror 118 causes the beams of light 108, 110, 112 to be moved. That is, as the angular position of the first scanning mirror 118 alters, so to does the angle of reflection of the beams of light 120, 122, 124 from the first scanning mirror 118. Thus, as the mirror oscillates the reflected beams of light 120, 122, 124 are scanned to produce movement of the beams of light 120, 122, 124 along one component of the two-dimensional display.

The second component of the two-dimensional display is produced by a second scanning device, such as a mirror 126. In the illustrated embodiment, the second mirror 126 is coupled to a motor 128 at a pivot point 130 so as to produce rotational or oscillating movement about an axis that is substantially orthogonal to the axis of rotation of the first mirror 118. The beams of light 120, 122, 124 are reflected off of the second mirror 126 as beams of light 132, 134, 136 and directed to a viewing surface 138. The viewing surface 138 may take on any of a variety of forms without departing from the spirit and scope of the instant invention. For example, the viewing surface 138 may be a fixed screen that may be front or back lit by the lasers 102, 104, 106 and may be contained in a housing (not shown) that is common with the LPD 100, or alternatively, the viewing surface 138 may take the form of any convenient, generally flat surface, such as a wall or screen, spaced from the LPD 100.

Figure 2:
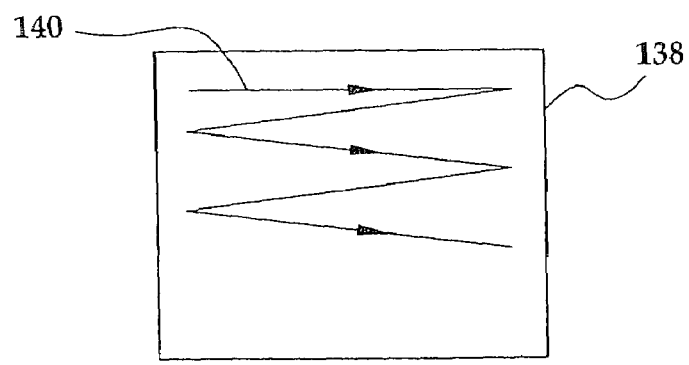
FIG. 2 is a stylistic view of a viewing surface shown in FIG. 1.

The second mirror 126 oscillates or rotates at a relatively slow rate, as compared to the rate of the first mirror 118 (e.g., about 60 hz). Thus, it will be appreciated that, as shown in FIG. 2, the beams of light 132, 134, 136 generally follow a path 140 on the display surface 138. Those skilled in the art will appreciate that the path 140 is similar in shape and concept to a raster scan commonly employed in cathode ray tube televisions and computer monitors.

While the instant invention is described herein in the context of an embodiment that employs separate first and second scanning mirrors 118, 126, those skilled in the art will appreciate that a similar path 140 may be produced by using a single mirror. The single mirror would be capable of being moved about two axis of rotation to provide the fast and slow oscillating movements along two orthogonal axes.

As is apparent from FIG. 1, owing to the angular positioning of the lasers 102, 104, 106, even though the lasers 102, 104, 106 have been arranged mechanically and optically to deliver the beams of light 108, 110, 112 within the same plane 114 and at the same point (on the rotational axis 120) on the mirror 118); each has a different angle of reflection, which causes the beams of light 120, 122, 124 to diverge. A controller 142 is provided to controllably energize the lasers 102, 104, 106 to effectively cause the beams of light 120, 122, 124 to appear to be collinear, such that they may be reflected off of the second mirror 126 and delivered to the same point on the viewing surface 138 (even though at different times) relatively independent of the distance of the viewing surface 138 from the second mirror 126.

Figure 3A:
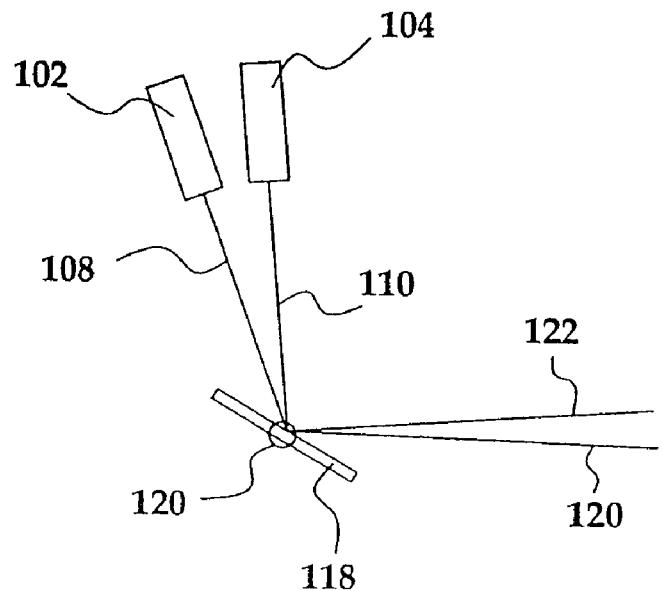
FIGS. 3A and 3B depict a top view of a scanning device at various times during its operation.
Figure 3B:
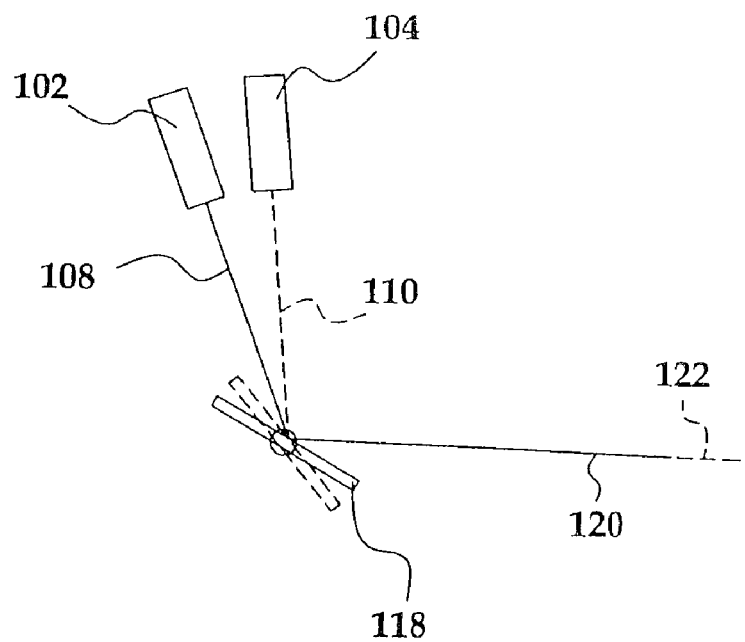

Turning now to FIGS. 3A and 3B, the operation of the controller 142 to cause the beams of light 120, 122, 124 to be collinear is discussed. To simplify the discussion, only two lasers 102, 104 are illustrated in FIG. 3, but those skilled in the art will appreciate that the concepts discussed herein may be extended to three or more lasers without departing from the spirit and scope of the instant invention. As shown in FIG. 3A, if the lasers 102, 104 are energized simultaneously, the reflected beams of light 120, 122 diverge. However, as shown in FIG. 3B, if the lasers 102, 104 are energized at slightly different times, then the beams of light 120, 122 can be made to follow a single, common path (i.e., the beams of light 120, 122 are collinear). For example, if the laser 102 is energized at a first time t1, then the mirror 118 will be at a first position, as represented by the solid lines, and the beam of light 108 will reflect off of the mirror 118 as the beam of light 120. Subsequently, if the laser 104 is energized at a second time t2, then the mirror 118 will be at a second position, as represented by the dashed lines, and the beam of light 110 will reflect off of the mirror 118 as the beam of light 122. By precisely controlling the time t2, the minor 118 will be in a position to accurately reflect the beam of light 122 along substantially the same path as the beam of light 120.

Thus, through the operation of the controller 142, the beams of light 120, 122 are substantially collinear, but are slightly displaced in time. That is, the beams of light 120, 122 will now both be projected onto substantially the same point on the display surface 138, but at slightly different times. However, owing to the persistence of the human eye, the variation in timing is not detectable. That is, in the case of the three laser system described in FIG. 1, each of the lasers 102, 104, 106 will controllably deliver laser light of a unique color and intensity to substantially the same point on the viewing surface 132 within a relatively short window of time. The human eye will not detect the three separate colors, bur rather will perceive a blending of the three light beams such that a consistent and desired hue appears at that point on the viewing surface. Those skilled in the art will appreciate that this process may be repeated numerous times along the path 140 to recreate a picture on the viewing surface 132.

Returning to FIG. 1, a photodetector 144 is arranged to receive laser light reflected from the viewing surface 138. The photodetector 144 may take any of a variety of forms, including a single photosensitive element or a plurality of photosensitive elements arranged in a grid. In some embodiments, it may be useful to include a mechanical/optical system 146 to focus the reflected laser light onto the photodetector 144.

Figure 4:
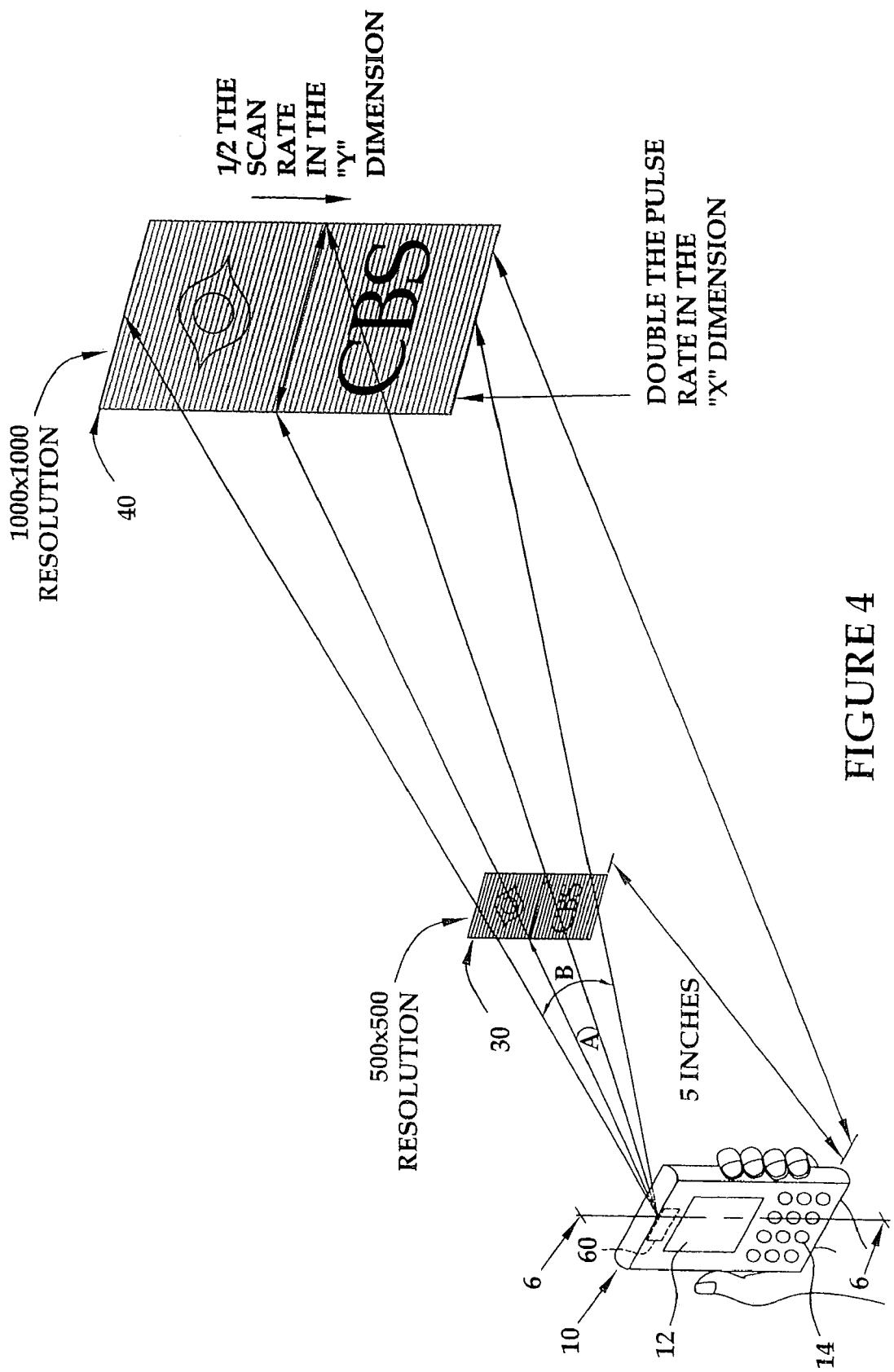
FIG. 4 depicts a laser projection display with varying resolution at varying distances.

The photodetector 144 is coupled to the controller 142 via a line 148. Signals indicative of the magnitude of the reflected laser light detected by the photodetector 144 may be communicated to the controller 142 over the line 148. In some instances, such as when the photodetector 144 is composed of a grid or an array of photosensors or photosensitive elements, it may be useful to also convey information regarding the location of the reflected laser light. As discussed in more detail in conjunction with FIG. 4, the controller 142 may use the information regarding the magnitude of the reflected laser light to generally determine if conditions within the transmission path of the lasers have changed, such as by being interrupted by a person or object. The controller 142 may use information regarding such an event to determine if the viewing surface has been touched. That is, the viewing screen may be rendered "touch sensitive," and thus, may provide a form of feedback from an operator.

The controller 142 may display a pushbutton or other accessible icon on the viewing surface, and if the controller 142 detects that the portion of the viewing surface displaying the pushbutton has been touched, then the controller 142 may take a responsive action. For example, the controller 142 may display an icon labeled "headlights," and if the controller 142 detects that a user has touched the "headlights" icon, the controller may turn on the headlights. Similarly, numerous other functions may implemented by way of appropriately configured or labeled icons displayed on the viewing surface.

Variable Resolution Display

A color display may be created using 2 or more lasers of different colors, where the laser light is scanned by the fast mirror 118 for the "X" resolution and the slow mirror 126 for the "Y" resolution (Y=parallel to gravitation). Many displays have a rectangular shape with a higher required resolution in the "X" dimension. In the illustrated embodiment, the "X" resolution is determined by the speed of laser pulsing. Based on the video input signal, the lasers are controlled to achieve the desired color.

Since fast scanning is accomplished in the "X" dimension, the resolution is limited by the pulsing frequency. That is, higher pulsing frequency translates to higher resolution. Under different operating conditions, it may be useful to alter the pulsing frequency. For example, it may be useful to have a higher resolution when the display is farther away (e.g., bigger display, see FIG. 4). Changing the "Y" frequency can change the "Y" resolution. Generally, the resolution may be increased by reducing "Y" frequency. For example, by slowing the frequency from 70 to 50 Hz, more horizontal lines will be scanned by the fast mirror over the course of traversing the 2-dimensional image.

Color Composition

Most color displays use red green and blue, but in some applications, other color combination can be used to achieve more limited but still useful range of colors. In particular, a 2-color display can be composed of a red laser, together with a blue/green laser (488 nM for example). In that case, the video signals for the blue and green colors will both activate the blue/green laser. Good color combination, at lower cost, can be achieved by a 2-laser configuration, which can be useful for low end applications like games, cell phones and PDA's. A higher speckle noise that may be produced from the lower number of lasers (2 instead of 3) can actually be an advantage in some cases like video games, where the speckle may be considered "cool" by some users, such as teens.

Another possibility is using red and blue lasers while using a green screen (or a green phosphor screen) or adding green LED illumination (same for red or blue).

Another possibility is using red and green lasers while disregarding the blue signal. By using a red laser with a longer wavelength than a normal red (650-630 nM), the combination of the longer wavelength red with green provides a wide variety of colors that can be acceptable in at least some applications.

Speckle Reduction, Power Enhancement

Figure 5:
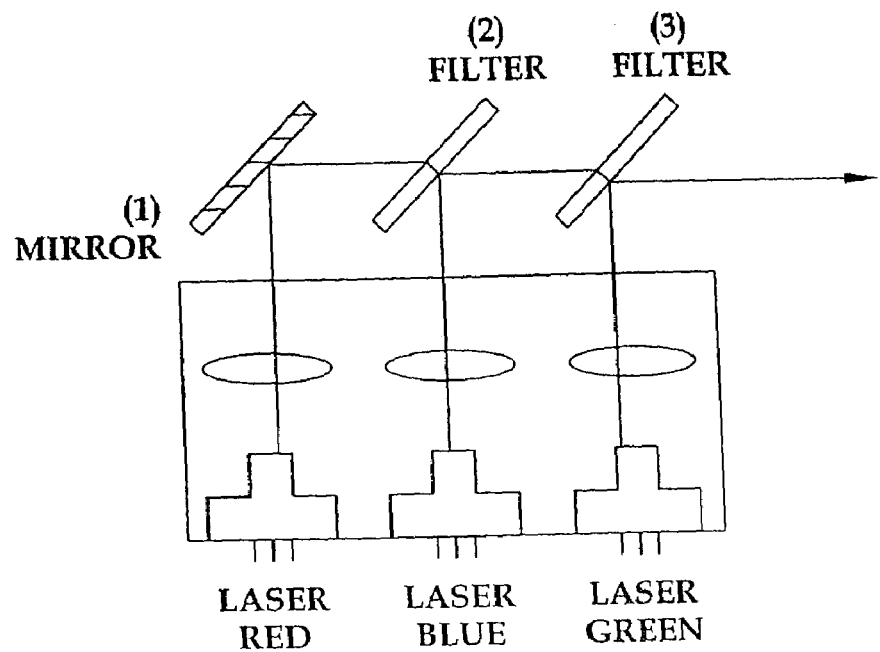
FIG. 5 depicts one embodiment of a laser projection display employing multiple green lasers.
Figure 5:
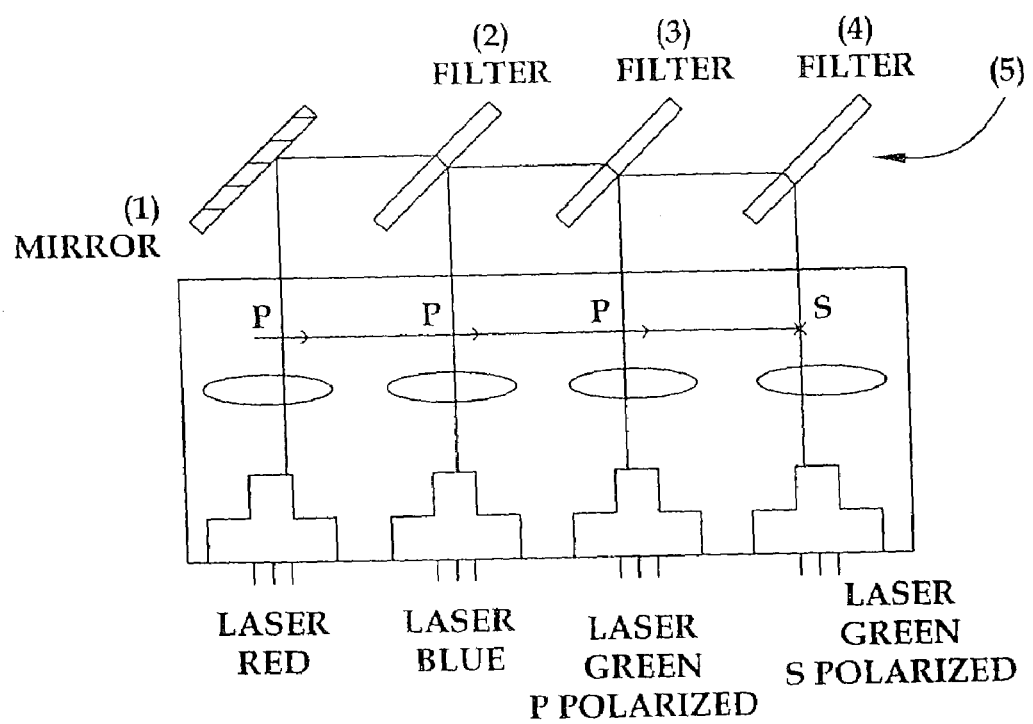

To reduce speckle noise, where needed, it may be useful to use more lasers that can be combined via orthogonal polarization. For example, if the green laser does not have enough power, it may be useful to employ a plurality of lasers of the same color. For example, in one embodiment, 4 lasers may be employed (a red laser, a blue laser, and 2 green lasers with orthogonal polarization), as shown in FIG. 5. Such an arrangement may be used to compensate for lower power while reducing speckle at the same time.

FIG. 5 also illustrates an alternative embodiment of the instant invention in which different colors lasers are combined into one substantially collinear beam using wavelength dependant filters (e.g., a filter that transmits blue and red but reflects green).

In an alternative embodiment, it may be useful to have a plurality of lasers that have similar polarization but have slightly different wavelengths (e.g., 490 nM and 510 nM). The different wavelength green lasers can be separated with a wavelength dependent filter but both may still be considered to be green.

Another possibility of using a 4th laser is to increase resolution by using both green lasers for increased resolution (each laser responsible for different pixels).

Yet another possibility for the 4th laser is to use an infrared (IR) laser that will not change the display but will allow special signal to be picked up by an infrared sensor.

One Projection, Multiple Displays

Figure 6:
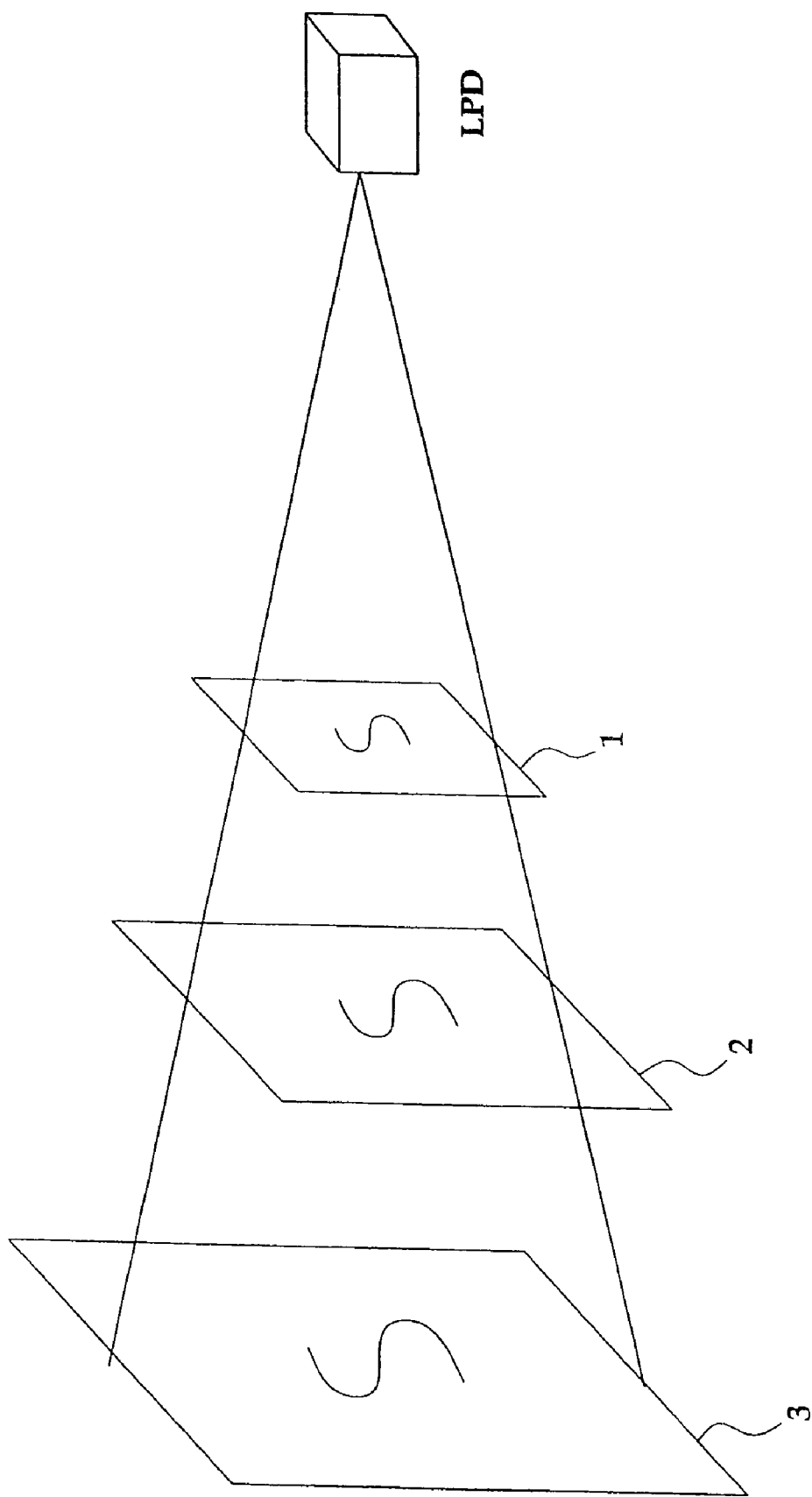
FIG. 6 depicts a laser projection display employing a plurality of screens.

With laser projection display, it may be useful to employ multiple displays that may be generally aligned but are spaced apart (along the path of the laser light) by a desired distance. Such an arrangement is feasible principally because the laser beams stays focused for a considerable distance. A plurality of semitransparent screens each partially reflect the same display. For example, each screen may be configured to reflect a portion of the laser light while passing a portion of the laser light (e.g., $1^{st}$ screen —70% transmission, $2^{nd}$ screen —50% transmission, and $3^{rd}$ screen —0% transmission ). Such an arrangement will provide 3 similar displays with increased sizes and similar brightness, as shown in FIG. 6.

Figure 7:
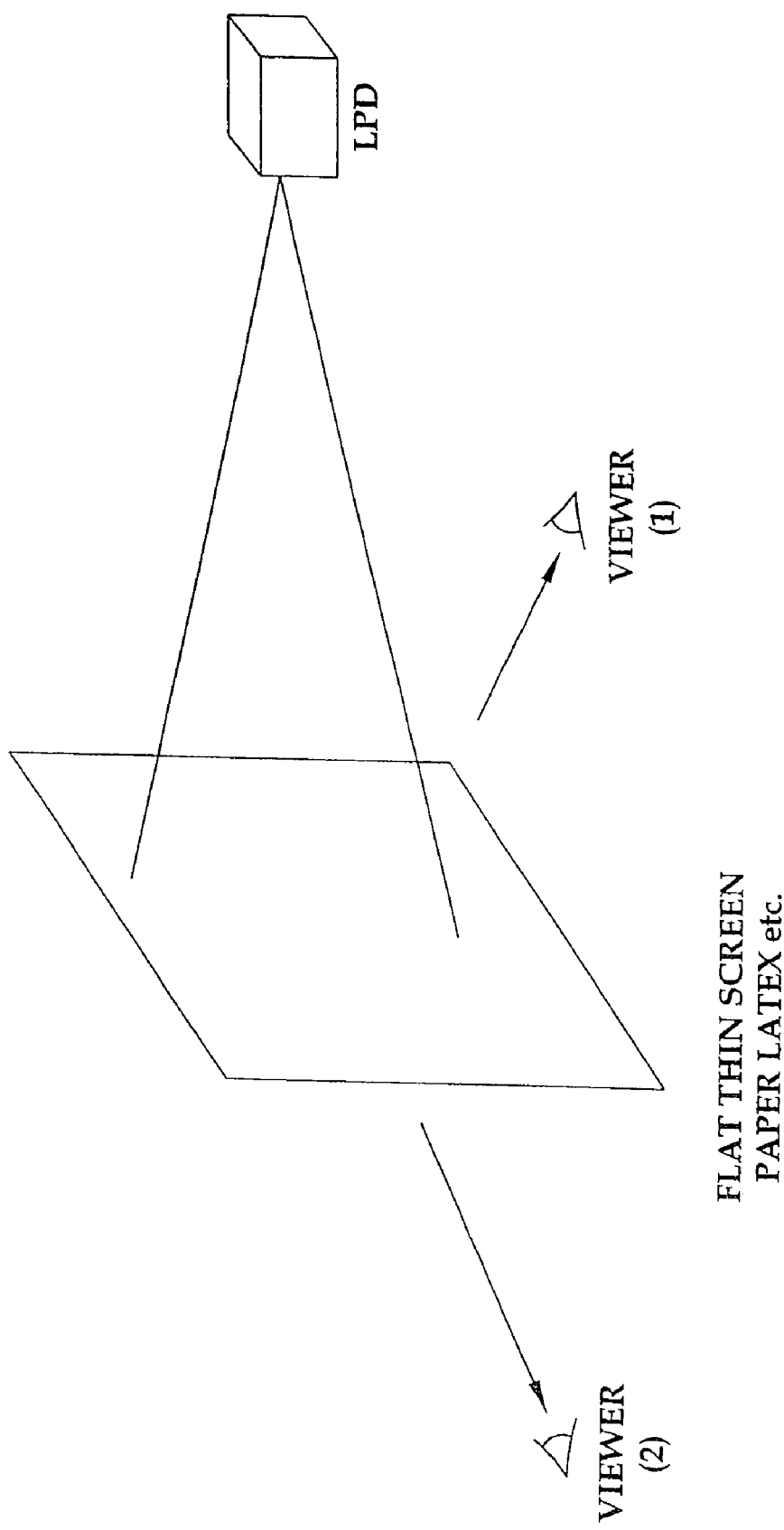
FIG. 7 depicts a screen for a laser projection display that may be viewed from opposite sides.

In another embodiment, it may be useful to view the same screen from both sides. As shown in FIG. 7, an identical but reverse image appears on both sides of a paper or other mat material screen. Such an arrangement may be useful for two-player video games or a digital camera that can display the picture both for the person taking the picture and the subject.

Cylindrical 360 Degree Display

Figure 8:
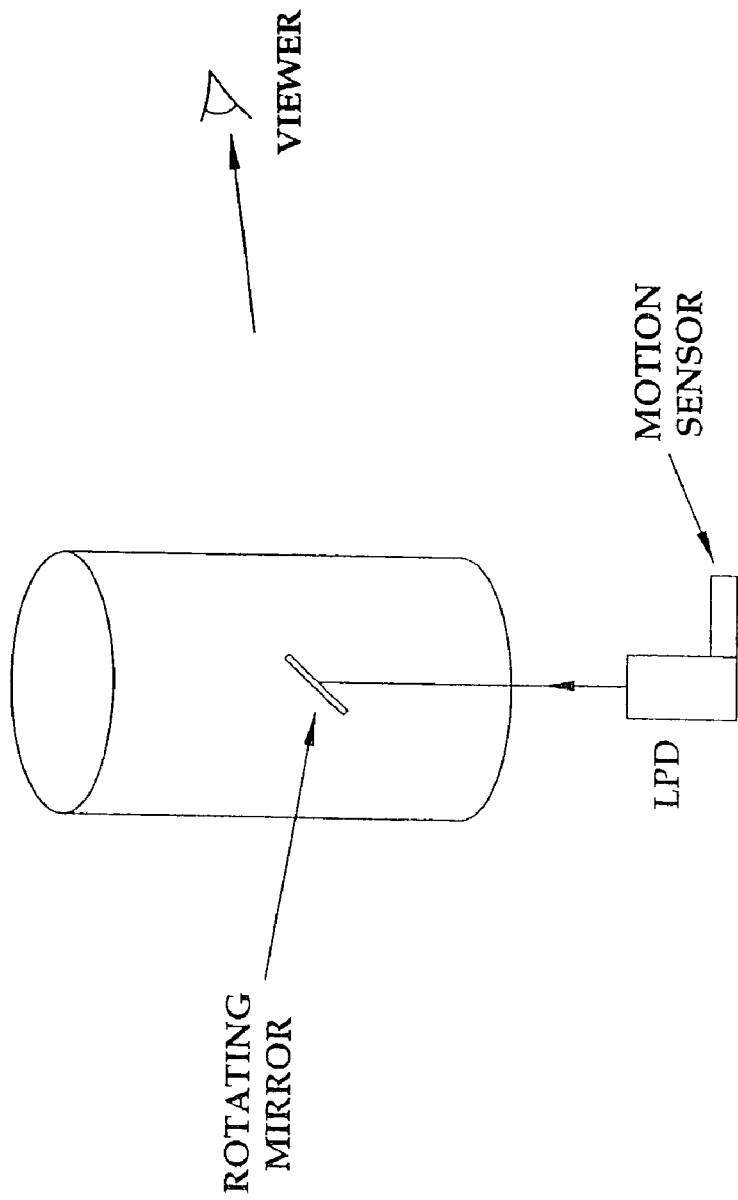
FIG. 8 depicts a cylindrical rotating screen for a laser projection display.

Referring to FIG. 8, one can use a rotating laser display, or multiple displays to create a cylindrical display with the spectator either inside the cylinder or outside. Motion and/or position sensors may be used to change the display based on spectator position. The sensors can be external (such as passive infrared motion sensors) or part of the LPD using an additional IR laser with IR sensor.

As a mirror on the inside of the cylinder rotates slowly, a rectangular image projected on the inside of the cylinder can be rotated around the cylinder. Alternatively, a high-speed mirror (greater than 40 Hz) can be used and a continuous image can be displayed on the entire cylinder surface.

This arrangement is particularly useful in advertising displays, where the image changes as the user is detected to move around the display. For example, an image of a salesperson can move as the user moves around the display.

It is also possible to have multiple motion sensors, and the video image modified to move with multiple viewers.

Laser Pointer as a Mouse

For remote TV or Computer web surfing, a laser pointer may be used for icon activation. The laser pointer may advantageously have two modes of operation. In a first mode of operation, the laser pointer may use a continuous wave (CW) mode for aiming the pointer at the desired icon. Thereafter, the laser pointer, by activation of a push button for example, may enter a pulse mode to activate the icon. An independent optical sensor (a camera or other sensors) may monitor the screen and identify, the location at which the laser was pointed when the pulse mode was received. Since the LPD controller "knows" the location of each icon being displayed, it can correlate the location information from the independent sensor to determine which, if any, icon is being activated.

Figure 9:
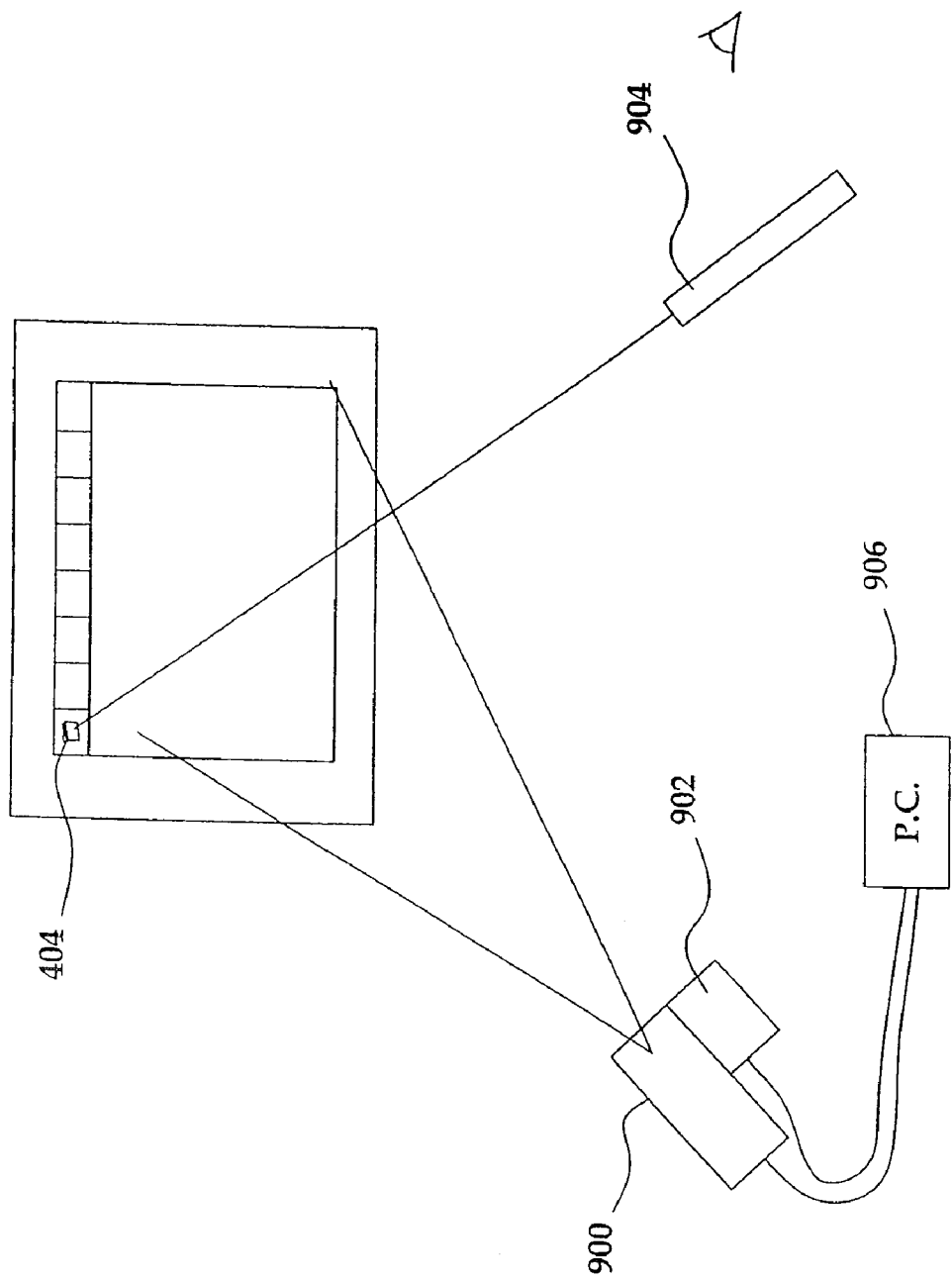
FIG. 9 depicts a laser projection display with a laser pointer.

An illustrative example is shown in FIG. 9. A standard projection display 900 (an LCD projector or DLP projector) is shown projecting a image onto a screen. A separate ccd camera 902 views the image and is capable of sensing the location of the laser pointer beam 904. The ccd camera 902 connects to a controller 906, such as a personal computer, and controls the program in a manner similar to a computer mouse. The CCD camera can be filtered so that it only senses the specific laserpointer wavelength.

Laser Pointer Mouse for Laser Projection Display

Figure 10:
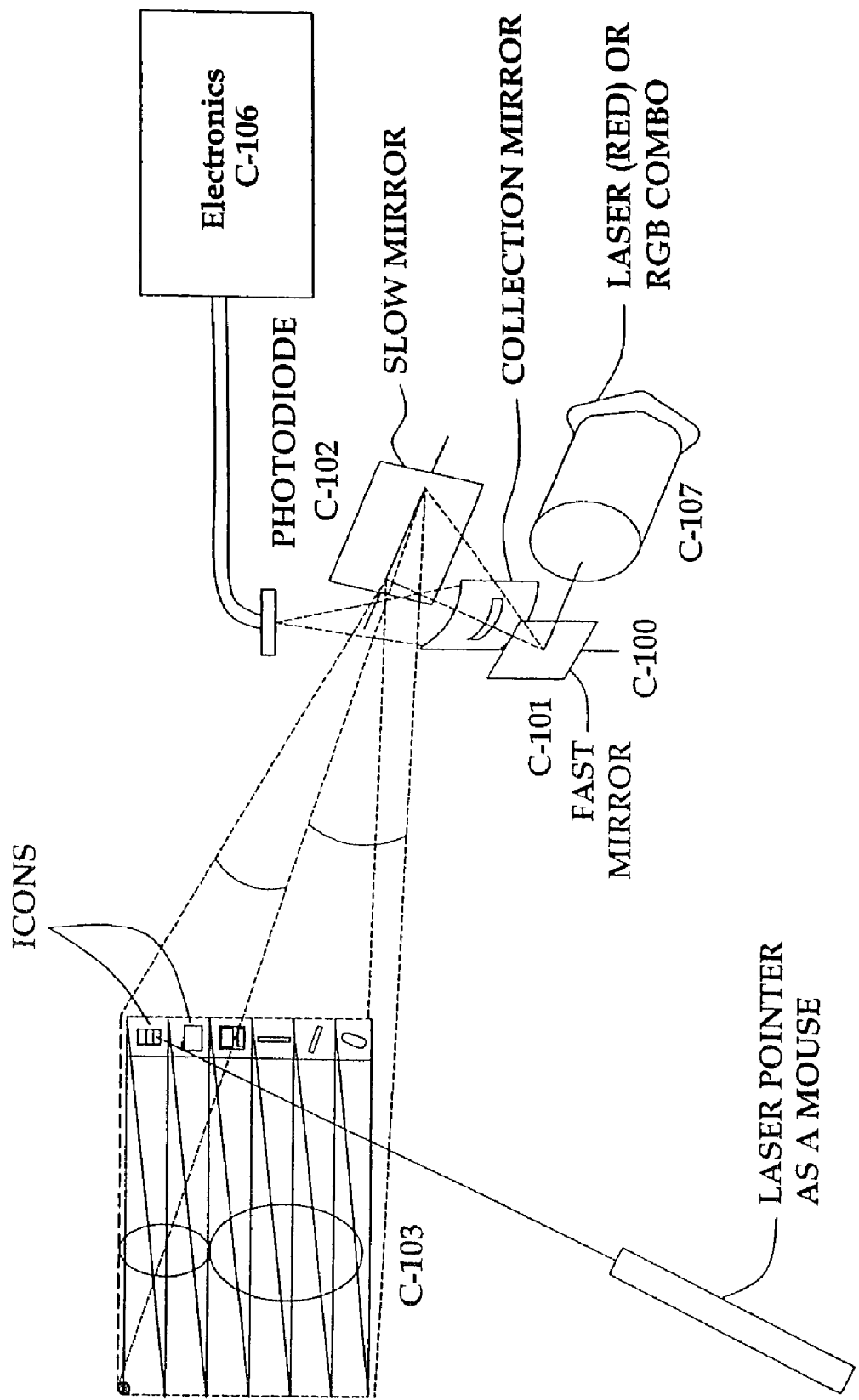
FIG. 10 depicts an alternative embodiment of a laser projection display with a laser pointer.

The projection display "X" mirror has to be small because it oscillates at a relatively high frequency (20 KHz). The "Y" mirror, on the other hand, oscillates at a relatively slow rate, and thus, can be substantially larger. As can be seen in FIG. 10, the larger size of the "Y" mirror allows the addition of a collection mirror and a photodiode to create a "semi retro" configuration. Using this configuration, icons may be placed on the side of the screen and a projection display detector will recognize when an external laser is projected onto the icon. If the "X" and "Y" mirrors are interchanged, the icons may be placed on the bottom part of the screen. Those icons can be used for control in a video game or menu in a television set. The frequency of the pointer laser can be matched to filters on the photodiode so that only the pointing laser (and not the display lasers) will be detected. An alternative method of separating the pointing laser from the display lasers would be to modulate the pointing laser at a known pattern. The processing would ignore any signal other than this known pattern.

As a method of selecting (equivalent to mouse clicking) the laser can be pulsed at a predetermined frequency, thereby alerting the control circuitry.

The laser pointer can hate multiple buttons. A first button can be used to energize the laser. A second button can be used to click. Alternatively, a single button with two position sensing can be used.

A TV/Monitor Screen using a Color Laser Projection Display

Figure 11:
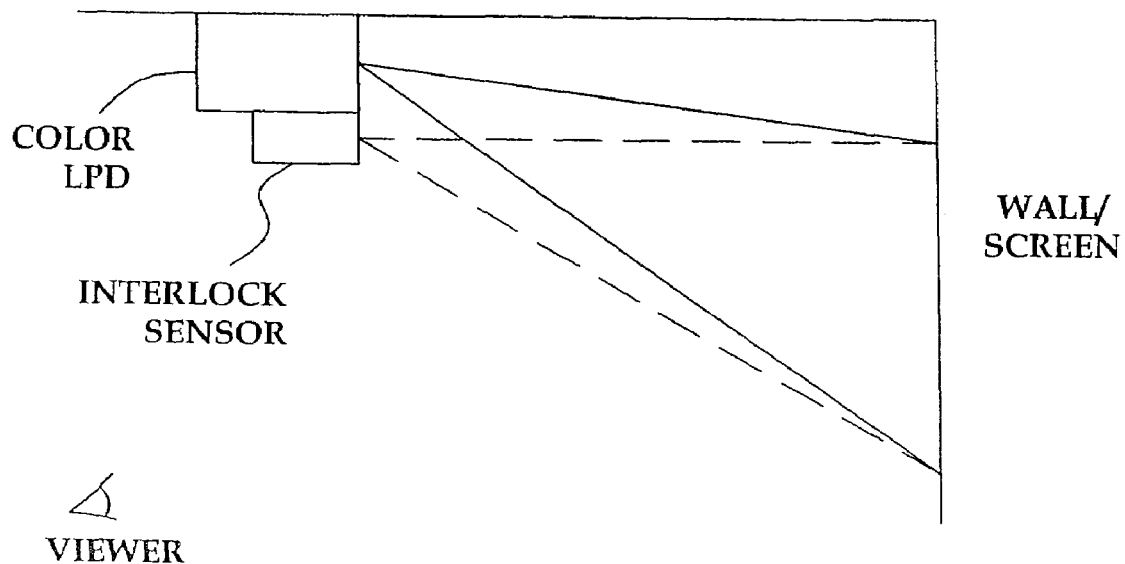
FIG. 11 depicts a laser projection display with an interlock sensor.

Referring to FIG. 11, an LPD with stronger laser power (1-5 W) can be used to project very large images (such as HDTV) on a wall or surface. Accordingly, the LPD can be used instead of conventional large screen TVs (Plasma, LCD, CRT, etc.) However, the problem exists that the output from an LPD is limited by the regulatory bodies to relatively low levels. One way of overcoming the regulatory limitation is to provide an interlock system in such a way that projection stops within a few pixels once it is determined that the lasers did not hit the screen. The semi-retro configuration of FIG. 10 can be used to sense whether the projected image is hitting the screen by sensing the relative strength of the received signal. If the signal is out of set boundry conditions, the lasers are turned off.

With smaller laser power (0.01-0.05 watts total optical power), an LPD may be sufficient for personal/portable DVD, video game consoles, cell phone displays and portable computers. Bigger displays like Laptop computers can be achieved with medium power lasers (0.05-0.1 W)

Figure 12:
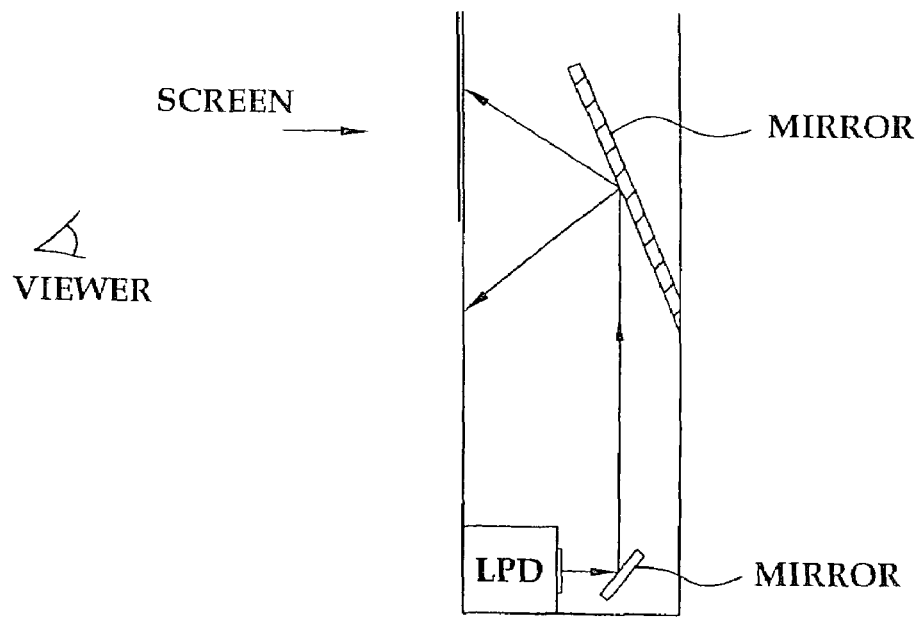
FIG. 12 depicts a laser projection display with a folded mirror arrangement.

FIG. 12 shows an LPD housed internally within a large screen TV. In this case, the power output of the LPD is not limited by the regulatory bodies since it is impossible for a user to see the direct laser beam. In this embodiment the units is kept very thin by folding the projected image and correcting the large optical deformation electronically.

3-D Display using Polarization and Color LPD

Figure 13A:
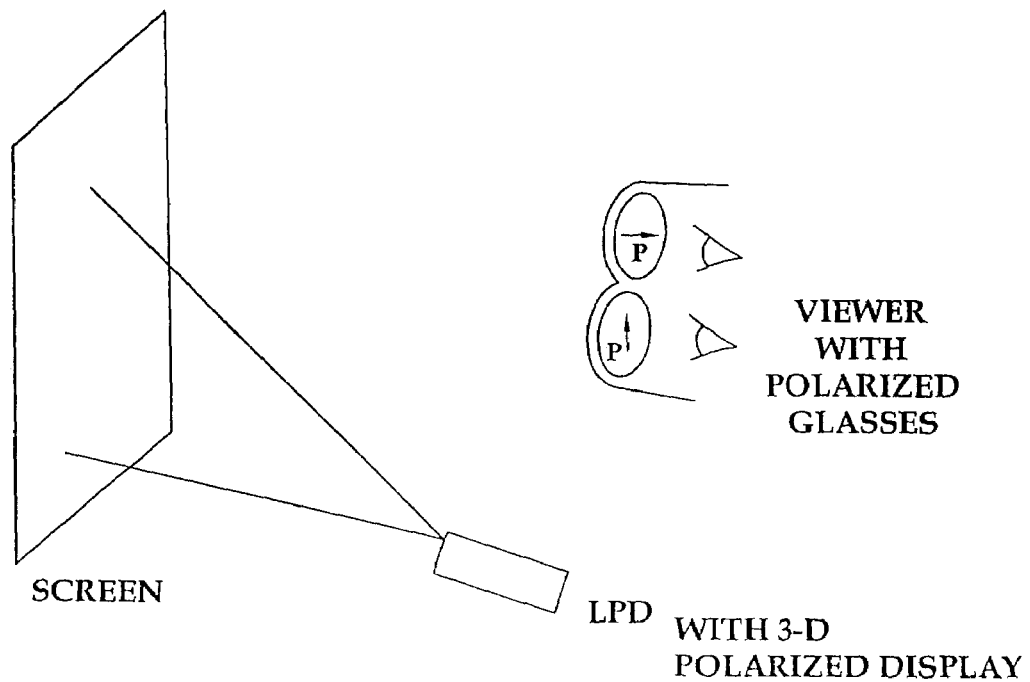
FIGS. 13A-13E depict various designs for a 3-dimensional laser projection display.

Typically, lasers have a defined linear polarization. In some embodiments, 2 lasers with orthogonal polarization may be used to project different images that can be seen separately by a viewer's left and right eyes using polarization filters (3-D polarized eye glasses), as shown in FIG. 13A. For example, as shown in FIG. 13C to enable a full RBG color 3-dimensional display, 6 lasers are needed-two red orthogonally polarized, two blue orthogonally polarized and two green orthogonally polarized. Each of the sets of colors that are polarized similarly projects a separate image onto the screen. Alternatively, where a blue-green laser replaces the two separate blue and green lasers, then only 4 lasers are needed for a full 3-D color display. For a low cost 3-D effect, only one additional laser is needed to obtain a 3-D effect only in one color.

Figure 13B:
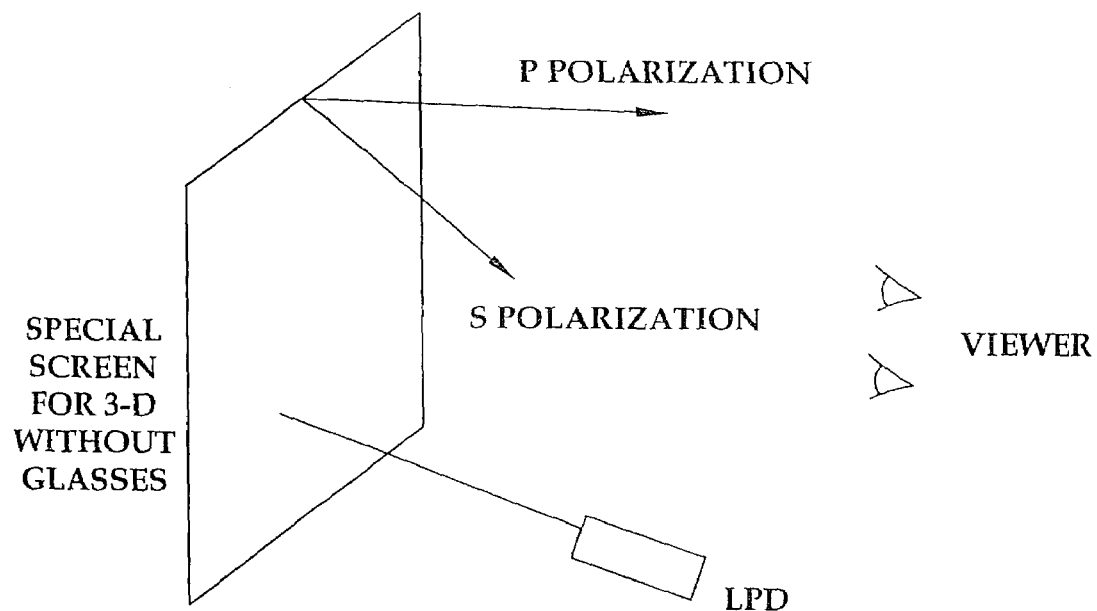
Figure 13C:
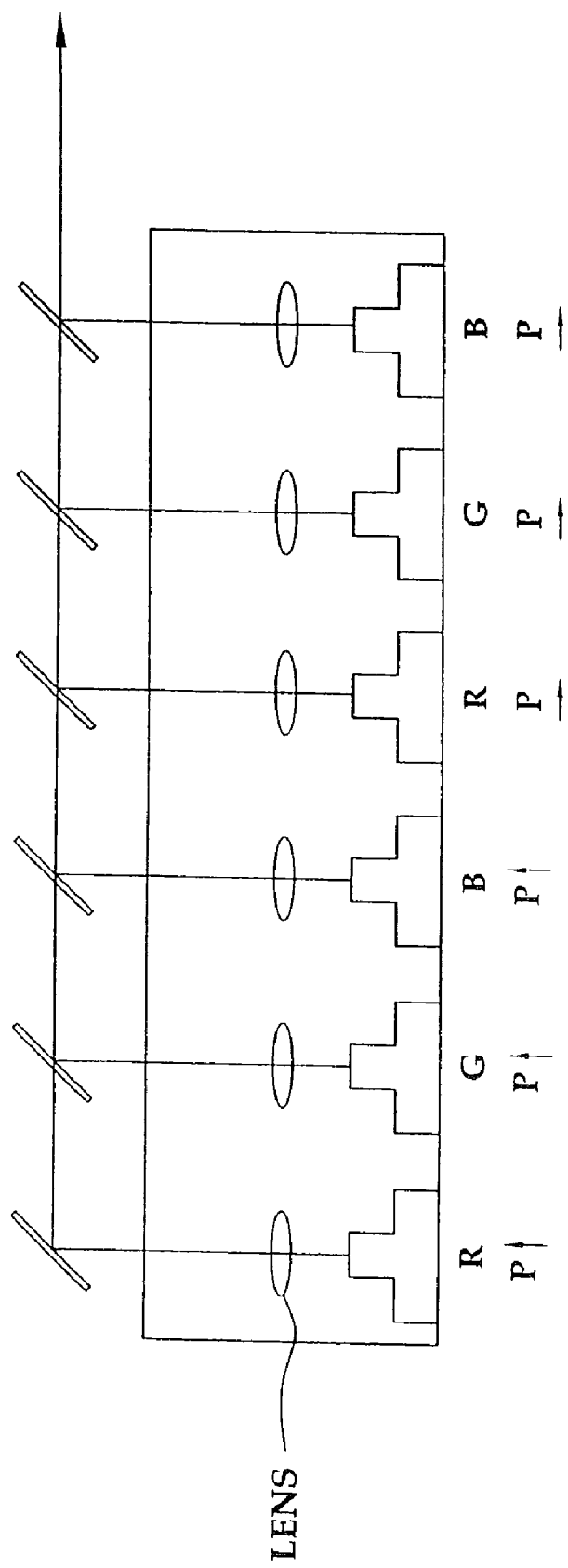
Figure 13D:
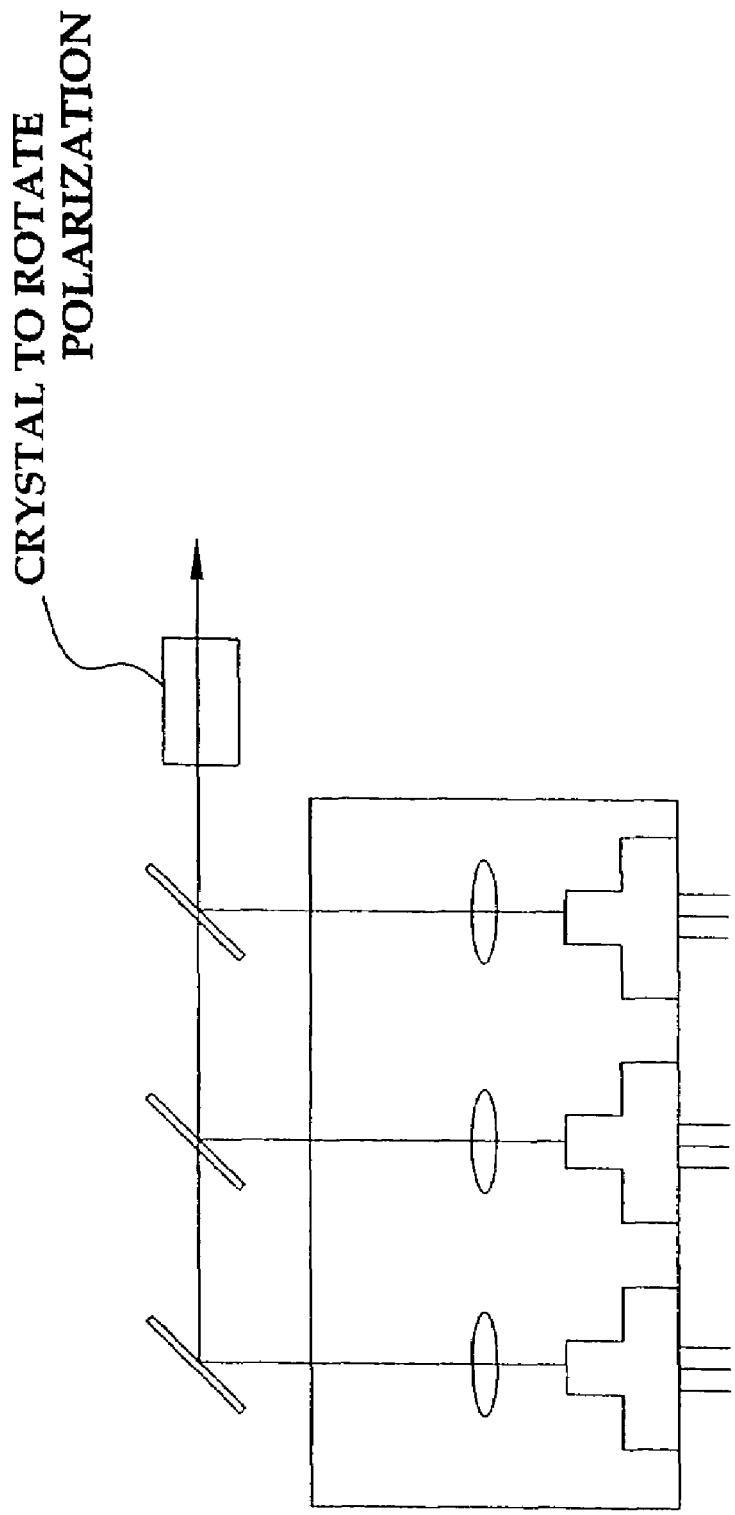

Alternatively, as shown in FIG. 13D, orthogonal polarization may be obtained with only 3 lasers by using a crystal that can rotate polarization. The crystal is placed in the optical path of the lasers and may be periodically activated to alter the polarization. The polarization can be rotated between frames of two projected images. This polarization change does not have to be fast since the eye has integration capacity. Polarization can be changed with every frame or every "X" scan lines, or alternatively the polarization may be altered with each scan of the "X" mirror, effectively producing two interlaced images, each having opposite polarization.

Figure 13E:
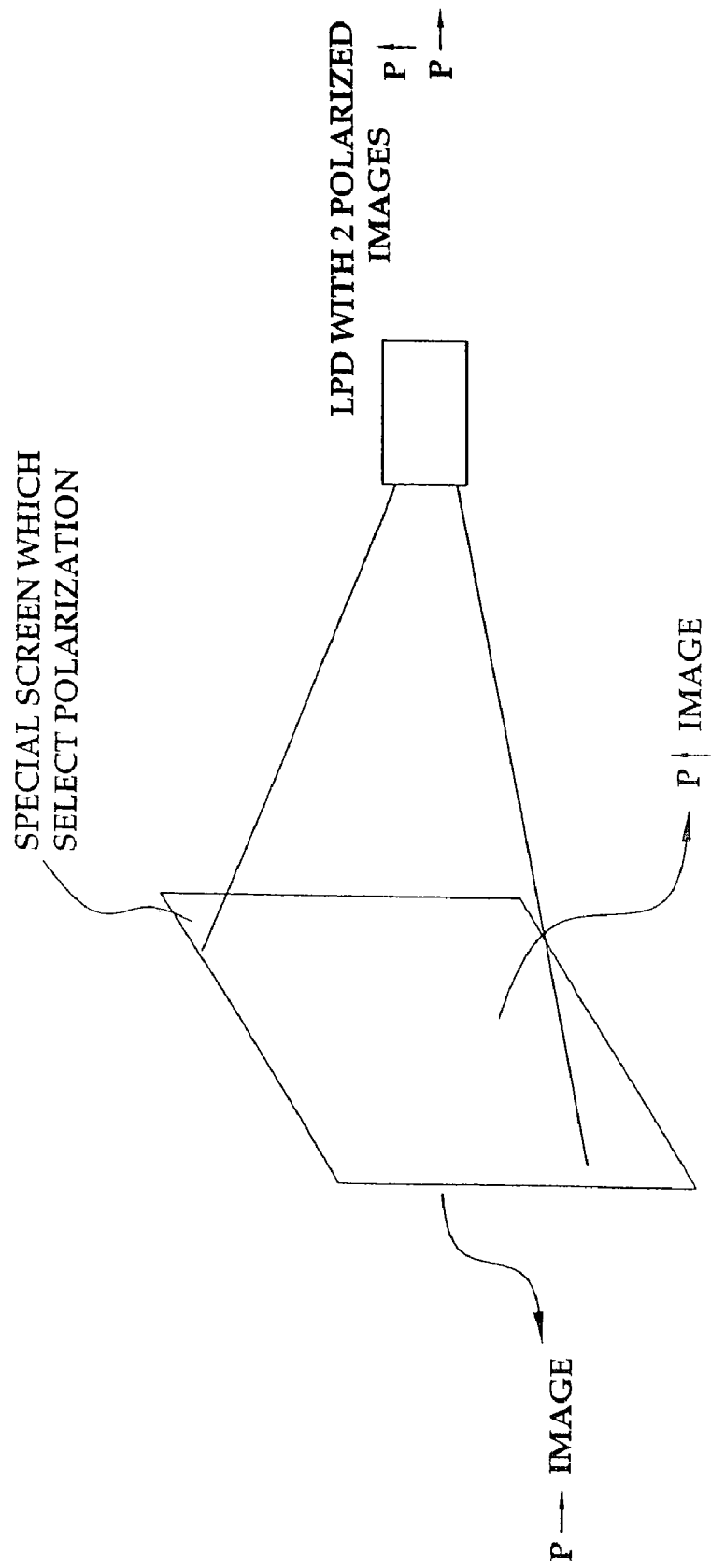

As shown in FIG. 13E, altering the polarization can also be used to produce a double sided screen, wherein each side displays a different image. In this case, a polarized screen is used so that one of the polarized images displayed on one side while the other polarized image passes through the screen and is displayed on the other side of the same screen. The screen can be made of glass with tiny wires at the right orientation to allow the second polarized image to pass through.

Referring to FIG. 13B, a 3D screen can be achieved without requiring the polarized glasses of FIG. 13A. In this embodiment, two different polarized images are projected towards a screen. In this case a polarization selective screen is utilized. The screen has different angular diffraction for different polarization, thereby directing the two images in two different angles so that each eye sees a slightly different image which will enhance 3-D effects .

A product can be designed having removeable screens, wherein the user selects the type of screen to achieve the desired effect. The screen type can be manually or automatically detected to change the content of the images projected.

Unless specifically stated otherwise, or as is apparent from the discussion, terms such as "processing" or "computing" or "calculating" or "determining " or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by the control units cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. Consequently, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. It is therefore evident that the particular embodiments disclosed above may be altered or modified and all such variations are considered within the scope and spirit of the invention. Accordingly, the protection sought herein is as set forth in the claims below.

We claim:

1. An arrangement for enabling an image to be viewed, comprising:
   a screen having a polarization selective property with different angular diffractions; and
   a projector for projecting the image on the screen for viewing by a viewer, the projector including an assembly for emitting laser beams of different, mutually orthogonal polarizations, and a scanner for sweeping one of the laser beams of one of the polarizations along scan lines comprised of pixels, selected ones of the pixels on the scan lines being illuminated by the one laser beam to form a first subimage on the screen, the scanner being also operative for sweeping the other of the laser beams of the other of the polarizations along additional scan lines comprised of pixels, selected ones of the pixels on the additional scan lines being illuminated by the other laser beam to form a second subimage on the screen, both subimages being viewable by the viewer from different viewing angles as a three-dimensional image due to the different angular diffractions for the mutually orthogonal polarizations.

2. The arrangement of claim 1, wherein the scanner sweeps each of the laser beams along mutually orthogonal directions to form each of the subimages as a raster pattern, the first subimage alternating with the second subimage on the screen.

3. The arrangement of claim 1, wherein the assembly includes a first set of lasers for emitting the one laser beam of the one polarization, and a second set of lasers for emitting the other laser beam of the other polarization.

4. The arrangement of claim 3, wherein each set of lasers includes a red laser, a blue laser and a green laser.

5. The arrangement of claim 1, wherein the assembly includes a plurality of lasers for emitting the one laser beam of the one polarization, and a polarization rotator for rotating the one laser beam to form the other laser beam of the other polarization.

6. A method of enabling an image to be viewed, comprising the steps of:
   providing a screen with a polarization selective property having different angular diffractions; and
   projecting the image on the screen for viewing by a viewer, by emitting laser beams of different, mutually orthogonal polarizations, and by sweeping one of the laser beams of one of the polarizations along scan lines comprised of pixels, selected ones of the pixels on the scan lines being illuminated by the one laser beam to form a first subimage on the screen, and by sweeping the other of the laser beams of the other of the polarizations along additional scan lines comprised of pixels, selected ones of the pixels on the additional scan lines being illuminated by the other laser beam to form a second subimage on the screen, both subimages being viewable by the viewer from different viewing angles as a three-dimensional image due to the different angular diffractions for the mutually orthogonal polarizations.

7. The method of claim 6, wherein the sweeping step is performed by sweeping each of the laser beams along mutually orthogonal directions to form each of the subimages as a raster pattern, the first subimage alternating with the second subimage on the screen.

8. The method of claim 6, wherein the emitting step is performed by a first set of lasers for emitting the one laser beam of the one polarization, and by a second set of lasers for emitting the other laser beam of the other polarization.

9. The method claim 8, wherein each set of lasers includes a red laser, a blue laser and a green laser.

10. The method of claim 6, wherein the emitting step is performed by a plurality of lasers for emitting the one laser beam of the one polarization, and by rotating the one laser beam to form the other laser beam of the other polarization.

* * * * *

UNITED STATES PATENT AND TRADEMARK OFFICE
CERTIFICATE OF CORRECTION

PATENT NO. : 7,445,339 B2
APPLICATION NO. : 11/582914
DATED : November 4, 2008
INVENTOR(S) : Paul Dvorkis et al.

It is certified that error appears in the above-identified patent and that said Letters Patent is hereby corrected as shown below:

ON THE COVER PAGE: Insert the following item [60]:

--Related U.S. Application Data
This application is a continuation of Application No. 10/837,022, filed on April 30, 2004 which claims benefit of Provisional Application No. 60/533,930, filed on December 31, 2003--

Signed and Sealed this

Twenty-third Day of November, 2010

David J. Kappos
*Director of the United States Patent and Trademark Office*